(12) United States Patent
Hou et al.

(10) Patent No.: US 12,474,738 B2
(45) Date of Patent: Nov. 18, 2025

(54) FOLDABLE STRUCTURAL MEMBER AND DISPLAY DEVICE

(71) Applicant: KunShan Go-Visionox Opto-Electronics Co., Ltd, Jiangsu (CN)

(72) Inventors: Hongqi Hou, Jiangsu (CN); Liwei Ding, Jiangsu (CN); Fu Liao, Jiangsu (CN); Yuhua Wu, Jiangsu (CN); Zhaoji Zhu, Jiangsu (CN); Kanglong Sun, Jiangsu (CN)

(73) Assignee: KUNSHAN GO-VISIONOX OPTO-ELECTRONICS CO., LTD, Kunshan (CN)

( * ) Notice: Subject to any disclaimer, the term of this patent is extended or adjusted under 35 U.S.C. 154(b) by 428 days.

(21) Appl. No.: 18/168,864

(22) Filed: Feb. 14, 2023

(65) Prior Publication Data
US 2023/0199092 A1   Jun. 22, 2023

Related U.S. Application Data

(63) Continuation of application No. PCT/CN2021/115165, filed on Aug. 27, 2021.

(30) Foreign Application Priority Data

Nov. 9, 2020 (CN) .......................... 202011241328.4

(51) Int. Cl.
G06F 1/16 (2006.01)
H04M 1/02 (2006.01)

(52) U.S. Cl.
CPC ........ G06F 1/1641 (2013.01); H04M 1/0222 (2013.01); H04M 1/0268 (2013.01); H04M 2201/38 (2013.01)

(58) Field of Classification Search
CPC .... G06F 1/1641; G06F 1/1679; G06F 1/1652; G06F 1/1681; G06F 1/16; G06F 21/44;
(Continued)

(56) References Cited

U.S. PATENT DOCUMENTS 6,890,008 B1 * 5/2005 Chuang ................ G06F 1/1616
292/124
10,412,844 B1  9/2019 Feng
(Continued)

FOREIGN PATENT DOCUMENTS

CN           2699355 Y      5/2005
CN         201629779 U     11/2010
(Continued)

OTHER PUBLICATIONS

International Search Report mailed Nov. 30, 2021, in International Application No. PCT/CN2021/115165, 8 pages.
(Continued)

*Primary Examiner* — Allen L Parker
*Assistant Examiner* — Keon Kim
(74) *Attorney, Agent, or Firm* — Maier & Maier, PLLC (57) ABSTRACT

A foldable structural member and a display device. The foldable structural member includes a structural main body including a first main body and a second main body distributed in a first direction, and a bending portion located between the first main body and the second main body, in which the foldable structural member is enabled to be switched between an unfolding state and a folding state by the bending portion, a buckle assembly, including a first buckle piece and a second buckle piece engaged with the first buckle piece, in which the first buckle piece is arranged on the first main body, and the second buckle piece is arranged on the second main body, in an inward-folding state or an outward-folding state, the first buckle piece is
(Continued)

buckled with the second buckle piece to connect the first main body with the second main body.

19 Claims, 4 Drawing Sheets

(58) Field of Classification Search
CPC ............ H04M 1/0222; H04M 1/0268; H04M 2201/38; H04M 1/0216; H04M 1/0214; H04M 1/0252; H04M 1/18; G09F 9/301
See application file for complete search history.

(56) References Cited

U.S. PATENT DOCUMENTS

| | | | |
|---|---|---|---|
| 11,375,789 B2 * | 7/2022 | Weber | ............... F16B 1/00 |
| 2005/0047069 A1 | 3/2005 | Chu | |
| 2019/0250663 A1 | 8/2019 | Park | |
| 2020/0174522 A1 | 6/2020 | Lim | |
| 2020/0178410 A1 | 6/2020 | Jeon et al. | |
| 2020/0212325 A1 * | 7/2020 | Seo | ............... H10K 77/111 |
| 2020/0326754 A1 | 10/2020 | Kim et al. | |

FOREIGN PATENT DOCUMENTS

| | | | | |
|---|---|---|---|---|
| CN | 103687376 | A | | 3/2014 |
| CN | 204229296 | U | | 3/2015 |
| CN | 204317786 | U | | 5/2015 |
| CN | 106711183 | A | | 5/2017 |
| CN | 206282175 | U | | 6/2017 |
| CN | 207910845 | U | | 9/2018 |
| CN | 208046698 | U | | 11/2018 |
| CN | 208211693 | U | * | 12/2018 |
| CN | 208243104 | U | | 12/2018 |
| CN | 208817244 | U | | 5/2019 |
| CN | 209017107 | U | | 6/2019 |
| CN | 110176188 | A | | 8/2019 |
| CN | 110267475 | A | | 9/2019 |
| CN | 209748968 | U | | 12/2019 |
| CN | 210444629 | U | | 5/2020 |
| CN | 210518451 | U | | 5/2020 |
| CN | 111277690 | A | | 6/2020 |
| CN | 210787528 | U | * | 6/2020 |
| CN | 111536143 | A | * | 8/2020 ........ H04M 1/0268 |
| CN | 111796789 | A | | 10/2020 |
| CN | 211653537 | U | | 10/2020 |
| CN | 211792409 | U | | 10/2020 |
| KR | 1020010035971 | A | | 5/2001 |
| KR | 200352399 | Y1 | | 6/2004 |
| KR | 1020180076271 | A | | 7/2018 |

OTHER PUBLICATIONS

First Office Action issued on Sep. 2, 2022, in corresponding China Application No. 202011241328.4, 8 pages Including Partial English-language translation.

Office Action issued on Feb. 27, 2024, in corresponding Chinese Application No. 202011241328.4, 12 pages.

Office Action issued on Jan. 15, 2024, in corresponding Korean Application No. 10-2023-7004917, with partial English translation, 13 pages.

Office Action issued on Jun. 30, 2023, in corresponding to Chinese Application No. 202011241328.4, 10 pages (with Concise Explanation of Relevance).

Office Action issued on Aug. 29, 2024, in corresponding Korean Application No. 10-2023-7004917, 4 pages.

Office Action issued on Dec. 12, 2023, in corresponding Japanese Application No. 2023-509820, 8 pages.

Extended Search Report issued on Dec. 15, 2023, in corresponding European Application No. 21888267.8, 8 pages.

Decision to Grant a Patent issued Apr. 23, 2024, in corresponding Japanese Application No. 2023-509820, 5 pages.

* cited by examiner

FOLDABLE STRUCTURAL MEMBER AND DISPLAY DEVICE

CROSS REFERENCE TO RELATED APPLICATION

The present application is a continuation of International Application No. PCT/CN2021/115165, filed on Aug. 27, 2021, which claims priority to Chinese Patent Application No. 202011241328.4, filed on Nov. 9, 2020, titled "FOLDABLE STRUCTURAL MEMBER AND DISPLAY DEVICE", both of which are hereby incorporated by reference in their entireties.

TECHNICAL FIELD

The present disclosure relates to the technical field of display devices, and in particular to a foldable structural member and a display device.

BACKGROUND

Since the release of folding screen mobile phones, global mobile phone manufacturers have successively launched their own folding screen mobile phone products. Whether it is inward folding, outward folding, horizontal folding or vertical folding, foldable screens have become the direction that many manufacturers are vying for layout. The mobile phone industry has ushered in a new track.

It is also a trend of future development that flexible foldable screens can meet the needs of both internal and external bending. However, when the display device can be folded inwards or bent, there is a problem that the display device cannot keep a folding state and may be opened automatically after being folded.

SUMMARY

Embodiments of the present application provide a foldable structural member and a display device, aiming at solving a problem that the display device cannot keep a folding state and may be opened automatically after being folded.

In a first aspect, the embodiments of the present application provide a foldable structural member for supporting a display panel. The foldable structural member includes: a structural main body including a first main body and a second main body distributed in a first direction, and a bending portion located between the first main body and the second main body, in which the foldable structural member is enabled to be switched between an unfolding state and a folding state by the bending portion, a buckle assembly including a first buckle piece and a second buckle piece engaged with the first buckle piece, in which the first buckle piece is arranged on the first main body, and the second buckle piece is arranged on the second main body, in an inward-folding state or an outward-folding state, the first buckle piece is buckled with the second buckle piece to connect the first main body with the second main body.

In a second aspect, the embodiments of the present application further provide a display device including the display panel and the foldable structural member according to any one of the above-mentioned embodiments in the first aspect.

In the foldable structural member in the embodiments of the present application, the foldable structural member includes the structural main body and the buckle assembly. The structural main body includes the first main body, the second main body and a bending portion. The structural main body can be switched among the unfolding state, inward-folding state and the outward-folding state by the bending portion. When a support structural member is used to support the display panel, the support structural member can drive the display panel to be switched between different states, so as to realize the multi-state display of the display panel. The buckle assembly includes the first buckle piece and the second buckle piece engaged with the first buckle piece. One of the first buckle piece and the second buckle piece is arranged on the first main body, and the other one is arranged on the second main body, so that when the structural main body is in the inward-folding state or outward-folding state, the first main body and the second main body are enabled to be buckled and connected with each other by the first buckle piece and the second buckle piece. Therefore, in the embodiments of the present application, the first buckle piece and the second buckle piece can be provided, so that a problem that the display device cannot keep a folding state and may be opened automatically after being folded can be solved.

DETAILED DESCRIPTION

In order to better understand the present application, a foldable support member and a display device in embodiments of the present application will be described in detail below with reference to FIGS. 1 to 9.

Figure 1:
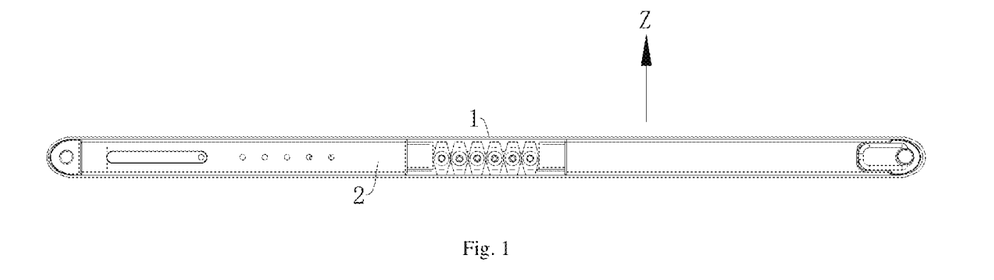
FIG. 1 shows a structural schematic view of a display device provided by an embodiment of an aspect of the present application in an unfolding state.
Figure 2:
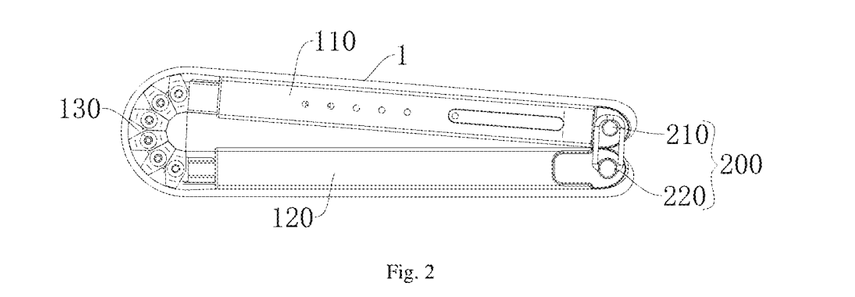
FIG. 2 shows a structural schematic view of a display device provided by an embodiment of an aspect of the present application in an inward-folding state.
Figure 3:
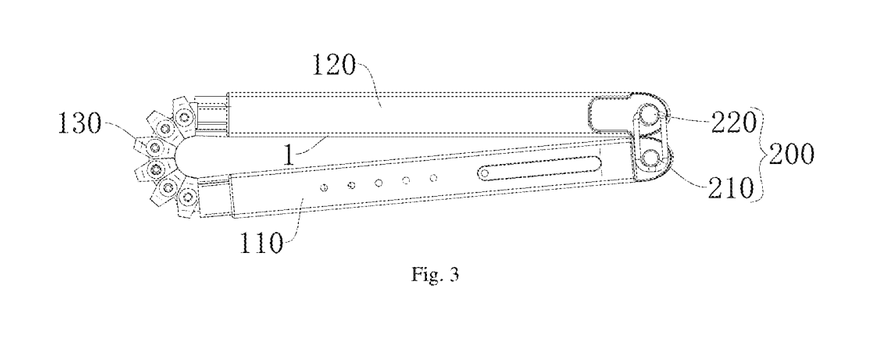
FIG. 3 shows a structural schematic view of a display device provided by an embodiment of an aspect of the present application in an outward-folding state.

Referring to FIG. 1 to FIG. 3 together, according to the display device provided by the embodiments of the present application, the display device includes a display panel 1 and a foldable structural member 2 for supporting the display panel 1. The display device is capable of switching between an unfolding state and a folding state. The folding state includes an inward-folding state and an outward-folding state.

The display panel 1 can be arranged at one side of the foldable structural member 2 in a thickness direction (Z direction in FIG. 1) of the display device. In the inward-folding state, the display panel 1 is located on an inner surface of the display device in the folding state and is wrapped by the foldable structural member 2, so that the foldable structural member 2 can provide better protection for the display panel 1. In the outward-folding state, the display panel 1 is located on an outer surface of the display device in the outward-folding state, and the foldable structural member 2 is folded inside the display panel 1, so that the display panel 1 can display better.

In some other embodiments, the display panel 1 can also be arranged at both sides of the display device in the thickness direction; either in the outward-folding state or in the inward-folding state, there is the display panel to display. The display panel 1 can be, for example, ring-shaped, and the foldable structural member 2 is located inside the ring-shaped display panel 1.

Figure 4:
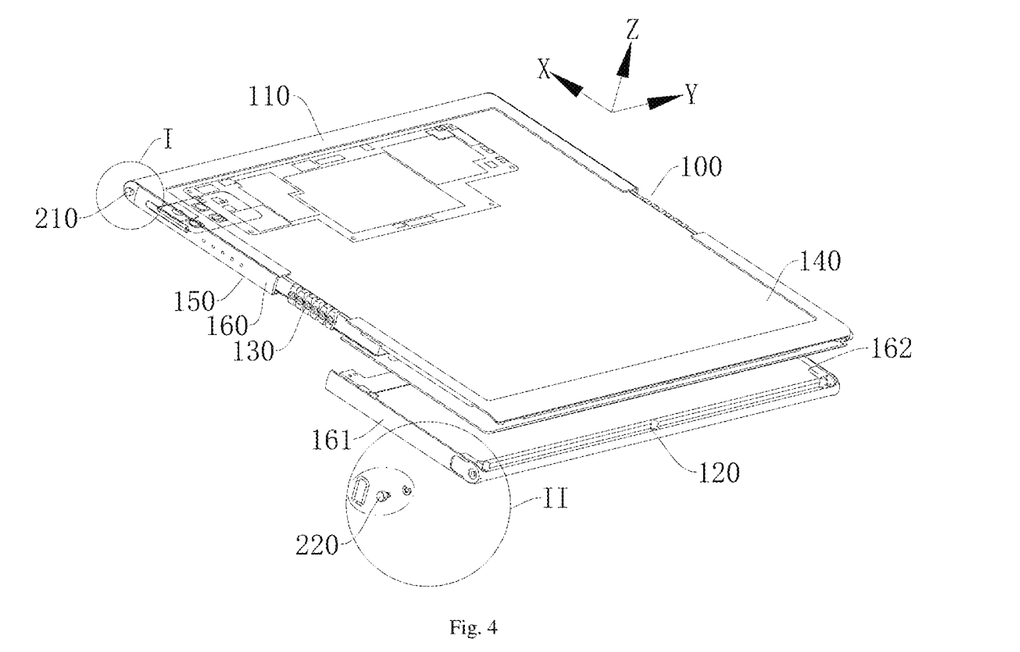
FIG. 4 shows a structural schematic view of a foldable structural member provided by another embodiment of the present application.

Referring to FIG. 4, the foldable structural member 2 may be the foldable structural member 2 in the display device provided by the embodiments in a first aspect.

FIG. 1 shows the foldable structural member 2 in the unfolding state; when the display device is in the unfolding state, the foldable structural member 2 is in the unfolding state. FIG. 2 shows the foldable structural member 2 in the inward-folding state; when the display device is in the inward-folding state, the foldable structural member 2 is in the inward-folding state. FIG. 3 shows the foldable structural member 2 in the outward-folding state; when the display device is in the outward-folding state, the foldable structural member 2 is in the outward-folding state.

In the foldable structural member 2 in the embodiments of the present application, the foldable structural member 2 includes a structural main body 100 and a buckle assembly 200. The structural main body 100 includes a first main body 110, a second main body 120 and a bending portion 130 distributed in a first direction (X direction in FIG. 4). The structural main body 100 can be switched among the unfolding state, the inward-folding state and the outward-folding state by the bending portion 130. When a support structural member is used to support the display panel 1, the support structural member can drive the display panel 1 to switch among the different states, so as to realize the multi-state display of the display panel 1. The buckle assembly 200 includes a first buckle piece 210 and a second buckle piece 220 buckled and engaged with the first buckle piece. One of the first buckle piece 210 and the second buckle piece 220 is arranged on the first main body 110, and the other one is arranged on the second main body 120, so that when the structural main body 100 is in the inward-folding state or outward-folding state, the first main body 110 and the second main body 120 are enabled to be buckled and connected with each other by the first buckle piece 210 and the second buckle piece 220. Therefore, in the embodiments of the present application, the first buckle piece 210 and the second buckle piece 220 can be provided, so that a problem that the display device cannot keep a folding state and may be opened automatically after being folded can be solved.

There are various positions of the first buckle piece 210 and the second buckle piece 220 arranged on the structural main body 100. Referring to FIG. 4, the structural main body 100 includes a first surface 140 and a second surface 150 opposite to each other in a thickness direction (Z direction in FIG. 4) of the foldable structural member 2, and a side surface 160 connecting the first surface 140 and the second surface 150. The first buckle piece 210 and the second buckle piece 220 can be arranged at the side surface 160, so that it can prevent the first buckle piece 210 and the second buckle piece 220 from interfering with the display panel 1.

The side surface 160 includes a first side face 161 and a second side face 162 opposite to each other in a width direction (Y direction in FIG. 4) of the foldable structural member 2, the first buckle piece 210 and the second buckle piece 220 are arranged at the first side face 161 and/or the second side face 162, and a bending line of the bending portion 130 extends in the width direction. Generally, the first side face 161 and the second side face 162 are the sides that users will not hold when using the display device. The first buckle piece 210 and the second buckle piece 220 can be arranged on the first side face 161 and/or the second side face 162. When the foldable structural member 2 is used in the display device, the first buckle piece 210 and the second buckle piece 220 will not affect grasping the display device by users, and can also prevent from affecting the first buckle piece 210 and the second buckle piece 220 buckled and engaged with each other due to grasping by the users.

The first buckle piece 210 can be arranged at a side of the first main body 110 away from the second main body 120, and the second buckle piece 220 can be arranged at a side of the second main body 120 away from the first main body 110. In other words, the first buckle piece 210 and the second buckle piece 220 can be arranged far from the bending portion 130, so that the buckling engagement between the first buckle piece 210 and the second buckle piece 220 can be achieved by a small buckle force.

There are various ways for the first buckle piece 210 and the second buckle piece 220 to buckle and engage with each other. The second buckle piece 210 is rotatably arranged between a first position and a second position relative to the second main body 120, so that in the inward-folding state, the first buckle piece 210 can be buckled with the second buckle piece 220 located at the first position to connect the first main body 110 with the second main body 120, and in the outward-folding state, the first buckle piece 210 can be buckled with the second buckle piece 220 located at the second position to connect the first main body 110 with the second main body 120.

In these optional embodiments, a position of the second buckle piece 220 can be rotatably arranged. In the inward-folding state or in the outward-folding state, the buckling connection between the first main body 110 and the second main body 120 can be realized by the engagement between the second buckle piece 220 and the first buckle piece 210, so that it can simplify a structure of the buckle assembly 200.

The first position means that when the second buckle piece 220 is at the position, the first main body 110 and the second main body 120 of the foldable structural member 2 in the inward-folding state can be buckled and connected with each other. As shown in FIG. 2, the second buckle piece 220 in FIG. 2 can be located at the first position.

The second position means that when the second buckle piece 220 is at the position, the first main body 110 and the second main body 120 of the foldable structural member 2 in the outward-folding state can be buckled and connected with each other. As shown in FIG. 3, the second buckle piece 220 in FIG. 3 can be located at the second position.

There are various ways for the second buckle piece 220 to be rotatably arranged between the first position and the second position relative to the second main body 120. For example, the second buckle piece 220 can be reversibly arranged around a second axis extending in the first direction. When the structural main body 100 switches from the inward-folding state to the outward-folding state, the first buckle piece 210 can move from one side of the second buckle piece 220 in the thickness direction of the structural body 100 to the other side of the second buckle piece 220. As shown in FIG. 2 and FIG. 3, when the structural main body 100 switches from the inward-folding state to the outward-folding state, the first buckle piece 210 can move from above the second buckle piece 220 to below the second buckle piece 220. The second buckle piece 220 can be reversibly arranged. When the structural main body 100 switches from the inward-folding state to the outward-folding state, the second buckle piece 220 can be still buckled and engaged with the first buckle piece 210 by reversing the second buckle piece 220.

Figure 5:
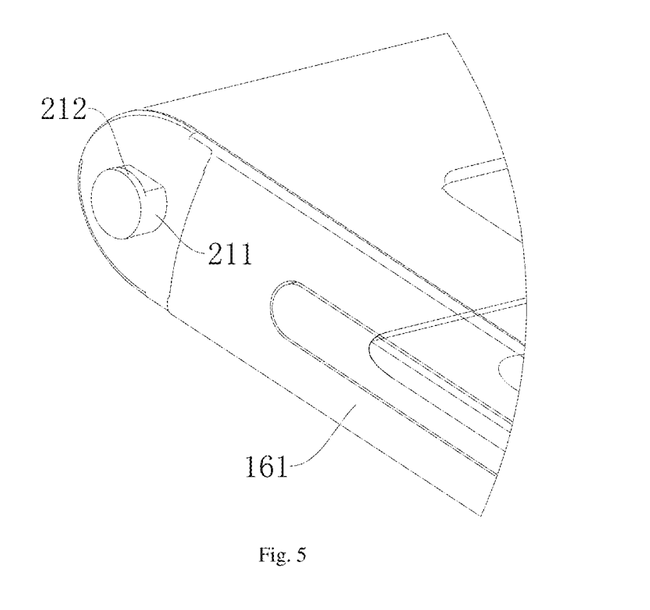
FIG. 5 shows a partially enlarged structural schematic view at part I in FIG. 4.
Figure 6:
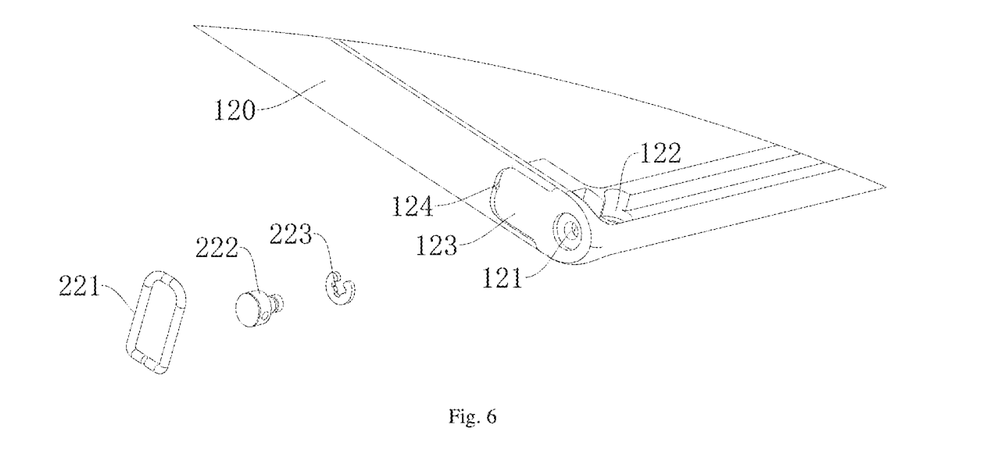
FIG. 6 shows a partially enlarged structural schematic view at part II in FIG. 4.

There are various ways to arrange the first buckle piece 210 and the second buckle piece 220. Referring to FIG. 5 and FIG. 6, the first buckle piece 210 includes a buckle column 211, the second buckle piece 220 includes a buckle ring 221 enabled to be buckled and engaged with the buckle column 211, and the buckle ring 221 is reversibly arranged around the second axis relative to the second main body 120. The buckle ring 221 can be reversed, so that either in the inward-folding state and in the outward-folding state, the first main body 110 and the second main body 120 can be buckled and engaged with each other by the buckle column 211 and the buckle ring 221.

Referring to FIG. 5, the buckle column 211 can be provided with at least one fixing portion 212 buckled and engaged with the buckle ring 221, so that the buckle ring 221 can be stopped at a side of the fixing portion 212 facing the first main body 110. When the buckle column 211 and the buckle ring 221 engages with each other, at least part of the buckle ring 221 can be located between the fixing portion 212 and the first main body 110. The fixing portion 212 provides a limiting force to the buckle ring 221 to ensure the stability of relative positions of the buckle ring 221 and the buckle column 211.

There are various ways to set the number and the shape of the fixing portion 212. Referring to FIG. 5, the fixing portion 212 can be configured as a concave structure located on a cylindrical face of the buckle column 211, and the buckle ring 221 can buckle on the concave structure. When the buckle ring 221 and the buckle column 211 engages with each other in the inward-folding state or the outward-folding state, the fixing portion 212 can provide the limiting force to the buckle ring 221. Alternatively, the fixing portion 212 can be configured as two protruding structures respectively arranged at two sides of the buckle ring 221 in the thickness direction. In the inward-folding state and outward-folding state, when the buckle ring 221 and the buckle column 211 engages with each other, the fixing portion 212 can provide the limiting force to the buckle ring 221.

In some other optional embodiments, the fixing portion 212 can be ring-shaped and arranged around a circumferential side of the buckle column 211. When the buckle column 211 and the buckle ring 221 are buckled and engaged with each other, the fixing portion 212 can provide the limiting force to the buckle ring 221 in different directions.

There are various ways for the buckle column 211 to be arranged on the first main body 110. For example, the buckle column 211 can be fixed at the side of the first main body 110. In some other optional embodiments, in an extending direction of the buckle column, the buckle column 211 can be telescopically arranged at the first main body 110. Optionally, the buckle column 211 can be movably arranged between a position inside the first main body 110 and a position protruding out of the first main body 110. When the foldable structural member 2 is in the unfolded state, the buckle column 211 and the buckle ring 221 do not need to be engaged with each other, and the buckle column 211 can be located in the first main body 110 to ensure the integrity and aesthetics of the foldable structural member 2. When the foldable structure 2 is in the inward-folding state or in the outward-folding state, and the buckle column 211 and the buckle ring 221 need to be engaged with each other, the buckle column 211 protrudes outside the first main body 110, so that the first main body 110 and the second main body 120 can be buckled and engaged with each other by the buckle column 211 and the buckle ring 221.

In some other optional embodiments, the second buckle piece 220 can be rotatably arranged around a first axis extending in a second direction relative to the second main body 120, so that the second buckle piece 220 can rotate between the first position and the second position relative to the second main body 120.

When the second buckle piece 220 is arranged at the first side face 161 and/or the second side face 162, the second direction is the width direction, and the first axis extends in the width direction. When the second buckle piece 220 is arranged on a face at an opposite end in the first direction, the second direction is parallel to the first direction, and the first axis extends in the first direction. It should be ensured that the second buckle piece 220 can rotate between the first position and the second position when rotating around the first axis, so that the first buckle piece 210 can be buckled and connected with the second buckle piece 220 to connect the first main body 110 with the second main body 120 in both of the inward-folding state and the outward-folding state.

Optionally, when the second buckle piece 220 can be rotatably arranged around the first axis relative to the second main body 120, the second buckle piece 220 can rotate to a predetermined position between the first position and the second position relative to the second main body 120, so that when there is a predetermined angle between the first main body 110 and the second main body 120 and the foldable structural member 2 is V-shaped, the first main body 110 and the second main body 120 are enabled to be buckled and connected with each other by the first buckle piece and the second buckle piece at the predetermined position. The predetermined position may be any position on a path from the first position to the second position. By arranging the second buckle piece 220 at the predetermined position, the predetermined angle can be formed between the first main body 110 and the second main body 120, so that it can meet various needs of users.

There are various ways in which the second buckle piece 220 is rotatably arranged relative to the second main body 120. Referring FIG. 6, the second buckle piece 221 further includes a connecting pin 222, the connecting pin 222 can be rotatably connected to the second main body 120, the buckle ring 221 can be connected to the second main body 120 by the connecting pin 222, and the buckle ring 221 is reversibly arranged around the second axis relative to the connecting pin 222. The buckle ring 221 can be rotatably arranged relative to the second main body 120 by the connecting pin 222, so that the buckle ring 221 can be arranged at a designated position by means of reversing and rotating.

Figure 7:
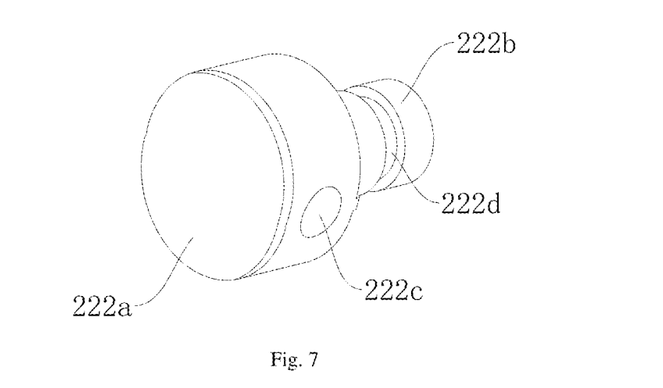
FIG. 7 shows a structural schematic view of a connecting pin of a foldable structural member provided by another embodiment of the present application.

Referring to FIG. 6 and FIG. 7 together, a mounting hole 121 can be formed on the second main body 120. The connecting pin 222 includes a connecting end 222a and a mounting end 222b distributed in an extending direction of the connecting pin, the buckle ring 221 can be connected to the connecting end 222a, the mounting end 222b can be rotatably connected to the mounting hole 121, and the connecting pin 222 can be rotatably arranged in the mounting hole 121 of the second main body 120.

A radial dimension of the mounting end 222b can be smaller than a radial dimension of the connecting end 222a. The radial dimension of the mounting end 222b can be smaller, so that it can reduce a space occupied by the connecting pin 222 on the second main body 120.

Figure 8:
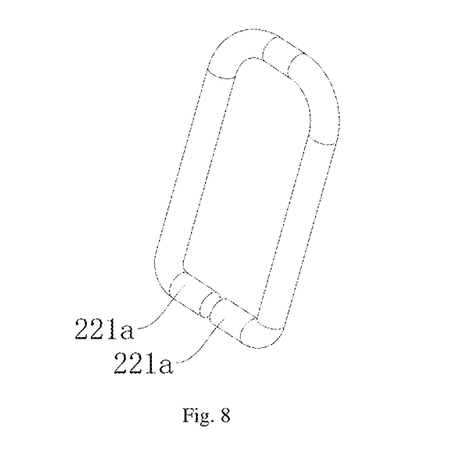
FIG. 8 shows a structural schematic view of a buckle ring of a foldable structural member provided by another embodiment of the present application.

Referring to FIG. 7 and FIG. 8 together, the connecting end 222a includes two connecting holes 222c with openings arranged facing away from each other, the buckle ring 221 includes two free ends 221a arranged opposite to each other, and the free ends 221a are rotatably arranged in the connecting holes 222c respectively. The buckle ring 221 can be formed by bending a strip-shaped structural member, and two ends of the strip-shaped structural member can be butted to form the buckle ring 221, so that the two free ends 221a which are arranged opposite to each other can be formed on the buckle ring 221. The free ends 221a can be arranged in the connecting holes 222c respectively, so that the buckle ring 221 can be connected to the connecting ends 222a.

A shape of a cross section of each of the free ends 221a may be circular, and each of the connecting holes 222c has an inner wall face with a cylindrical shape, so that the free ends 221a can be rotatably arranged in the connecting holes 222c, and the buckle ring 221 can be reversibly arranged relative to the connecting ends 222a by the engagement of the two free ends 221a and the two connecting holes 222c.

Referring to FIG. 6, the second main body 120 further includes a receiving space 122 communicated with the mounting hole 121. The mounting end 222b can extend into the receiving space 122 through the mounting hole 121, the second buckle piece 220 further includes a stopper 223, the stopper 223 can be located in the receiving space 122 and connected to the mounting end 222b to prevent the connecting pin 222 from falling off from the mounting hole 121.

Figure 9:
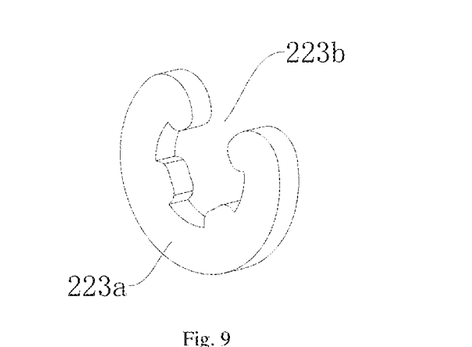
FIG. 9 shows a structural schematic view of a stopper of a foldable structural member provided by another embodiment of the present application.

Referring to FIG. 7 to FIG. 9 together, the mounting end 222b may be provided with the stopper 223 which can stably fix the connecting pin 222 on the second main body 120. The stopper 223 includes a body portion 223a in a shape of ring and a notch 223b located on the body portion 223a, such that the body portion 223a can sleeve the mounting end 222b through the notch 223b of the stopper 223. The stopper 223 can be mounted on the mounting end 222b by means of arranging the notch 223b, so that it can improve the mounting efficiency of the foldable structural member 2.

A mounting groove 222d can be arranged at the mounting end 222b, so that the stopper 223 can be buckled into the mounting groove 222d.

Referring to FIG. 6, a receiving groove 123 can be formed on the second main body 120 to receive the buckle ring 221. An extruding portion 124 can be arranged in the receiving groove 123, such that when the buckle ring 221 is located in the receiving groove 123, the extruding portion 124 can be in interference fit with the buckle ring 221, so as to ensure the stability of relative positions of the buckle ring 221 and the receiving groove 123.

While the application has been described with reference to the preferred embodiments, various modifications may be made and equivalents may be substituted for the portions in the embodiments without departing from the scope of the present application. In particular, as long as there is no structural conflict, the technical features mentioned in the various embodiments can be combined in any manner. The present application is not limited to the specific embodiments disclosed herein, but includes all technical solutions falling within the scope of the claims.

What is claimed is:

1. A foldable structural member for supporting a display panel, comprising:
    a structural main body, comprising a first main body and a second main body distributed in a first direction, and a bending portion located between the first main body and the second main body, wherein the foldable structural member is switched between an unfolding state and a folding state by the bending portion; and
    a buckle assembly, comprising a first buckle piece and a second buckle piece engaged with the first buckle piece, wherein the first buckle piece is arranged on the first main body, and the second buckle piece is arranged on the second main body; and in the folding state, the first buckle piece is buckled with the second buckle piece to connect the first main body with the second main body,
    wherein the first buckle piece comprises a buckle column, the second buckle piece comprises a buckle ring engaged with the buckle column, the buckle ring is reversibly arranged around the second axis relative to the second main body, and
    the buckle column is provided with at least one fixing portion engaged with the buckle ring, to stop the buckle ring at a side of the fixing portion facing the first main body.

2. The foldable structural member according to claim 1, wherein the folding state comprises an inward-folding state and an outward-folding state.

3. The foldable structural member according to claim 2, wherein
    the second buckle piece is rotatably arranged between a first position and a second position relative to the second main body, in the inward-folding state, the first buckle piece is buckled with the second buckle piece located at the first position to connect the first main body with the second main body, and in the outward-folding state, the first buckle piece is buckled with the second buckle piece located at the second position to connect the first main body with the second main body.

4. The foldable structural member according to claim 3, wherein the second buckle piece is rotatably arranged around a first axis extending in a second direction relative to the second main body to rotate the second buckle piece between the first position and the second position.

5. The foldable structural member according to claim 4, wherein the second buckle piece is rotatable to a predetermined position between the first position and the second position relative to the second main body, when there is a predetermined angle between the first main body and the second main body and the foldable structural member is V-shaped, the first buckle piece is buckled with the second buckle piece at the predetermined position to connect the first main body with the second main body.

6. The foldable structural member according to claim 3, wherein the second buckle piece is reversibly arranged around a second axis extending in the first direction, to rotate the second buckle piece between the first position and the second position relative to the second main body.

7. The foldable structural member according to claim 6, wherein in an extending direction of the buckle column, the buckle column is telescopically arranged at the first main body.

8. The foldable structural member according to claim 6, wherein the second buckle piece further comprises a connecting pin, the connecting pin is rotatably connected to the second main body, the buckle ring is connected to the second main body by the connecting pin, and the buckle ring is reversibly arranged around the second axis relative to the connecting pin.

9. The foldable structural member according to claim 8, wherein
a mounting hole is formed on the second main body; and
the connecting pin comprises a connecting end and a mounting end distributed in an extending direction thereof, the buckle ring is connected to the connecting end, and the mounting end is rotatably connected to the mounting hole.

10. The foldable structural member according to claim 9, wherein the connecting end comprises two connecting holes with openings arranged facing away from each other, the buckle ring comprises two free ends arranged opposite to each other, and the free ends are rotatably arranged in the connecting holes respectively.

11. The foldable structural member according to claim 9, wherein
the second main body further comprises a receiving space communicated with the mounting hole; and
the mounting end extends into the receiving space through the mounting hole, the second buckle piece further comprises a stopper, and the stopper is located in the receiving space and connected to the mounting end to prevent the connecting pin from falling off from the mounting hole.

12. The foldable structural member according to claim 11, wherein the stopper comprises a body portion in a shape of ring and a notch located on the body portion to assemble the body portion with the mounting end through the notch of the stopper.

13. The foldable structural member according to claim 8, wherein a receiving groove is formed on the second main body, and the buckle ring is detachably accommodated in the receiving groove.

14. The foldable structural member according to claim 13, wherein an extruding portion is arranged in the receiving groove; when the buckle ring is located in the receiving groove, the extruding portion is in interference fit with the buckle ring.

15. The foldable structural member according to claim 2, wherein the structural main body comprises a first surface and a second surface opposite to each other in a thickness direction of the foldable structural member, and a side surface connecting the first surface and the second surface; and the first buckle piece and the second buckle piece are arranged at the side surface.

16. The foldable structural member according to claim 15, wherein the side surface comprises a first side face and a second side face opposite to each other in a width direction of the foldable structural member, the first buckle piece and the second buckle piece are arranged in at least one of the first side face and the second side face, and a bending line of the bending portion extends in the width direction.

17. The foldable structural member according to claim 2, wherein the first buckle piece is arranged at a side of the first main body away from the second main body, and the second buckle piece is arranged at a side of the second main body away from the first main body.

18. The foldable structural member according to claim 1, wherein the at least one fixing portion comprises a plurality of fixing portions at two sides of the buckle column in a thickness direction of the foldable structural member to stop the buckle column by the fixing portions in both the inward-folding state and the outward-folding state.

19. A display device, comprising
display panel,
the foldable structural member according to claim 1.

* * * * *